July 17, 1934. L. D. MYERS 1,966,993
WINDSHIELD CONTROL
Filed Nov. 20, 1931 3 Sheets-Sheet 2
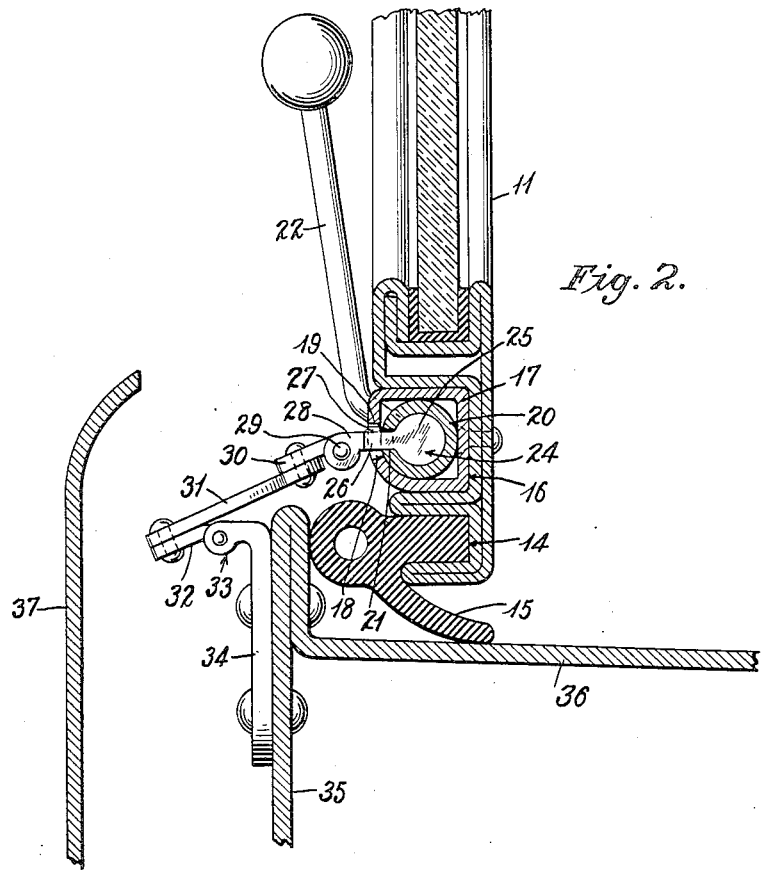
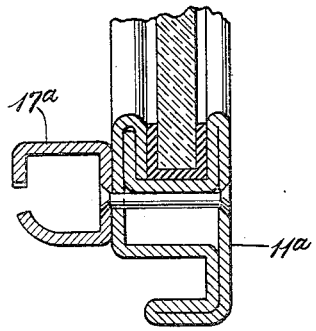
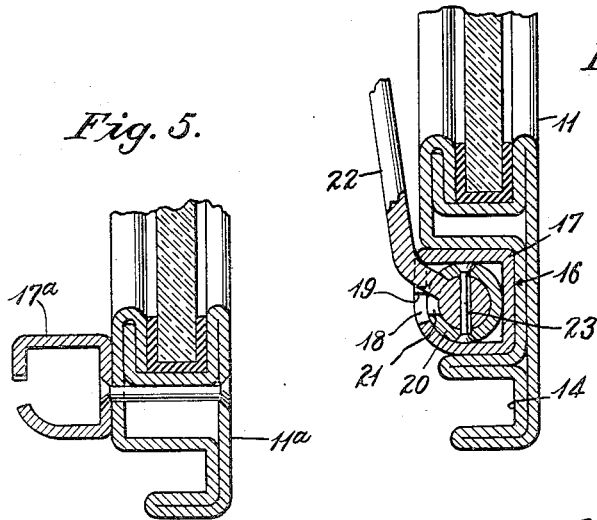
Inventor
L. D. Myers
By Bacon + Thomas
Attorneys

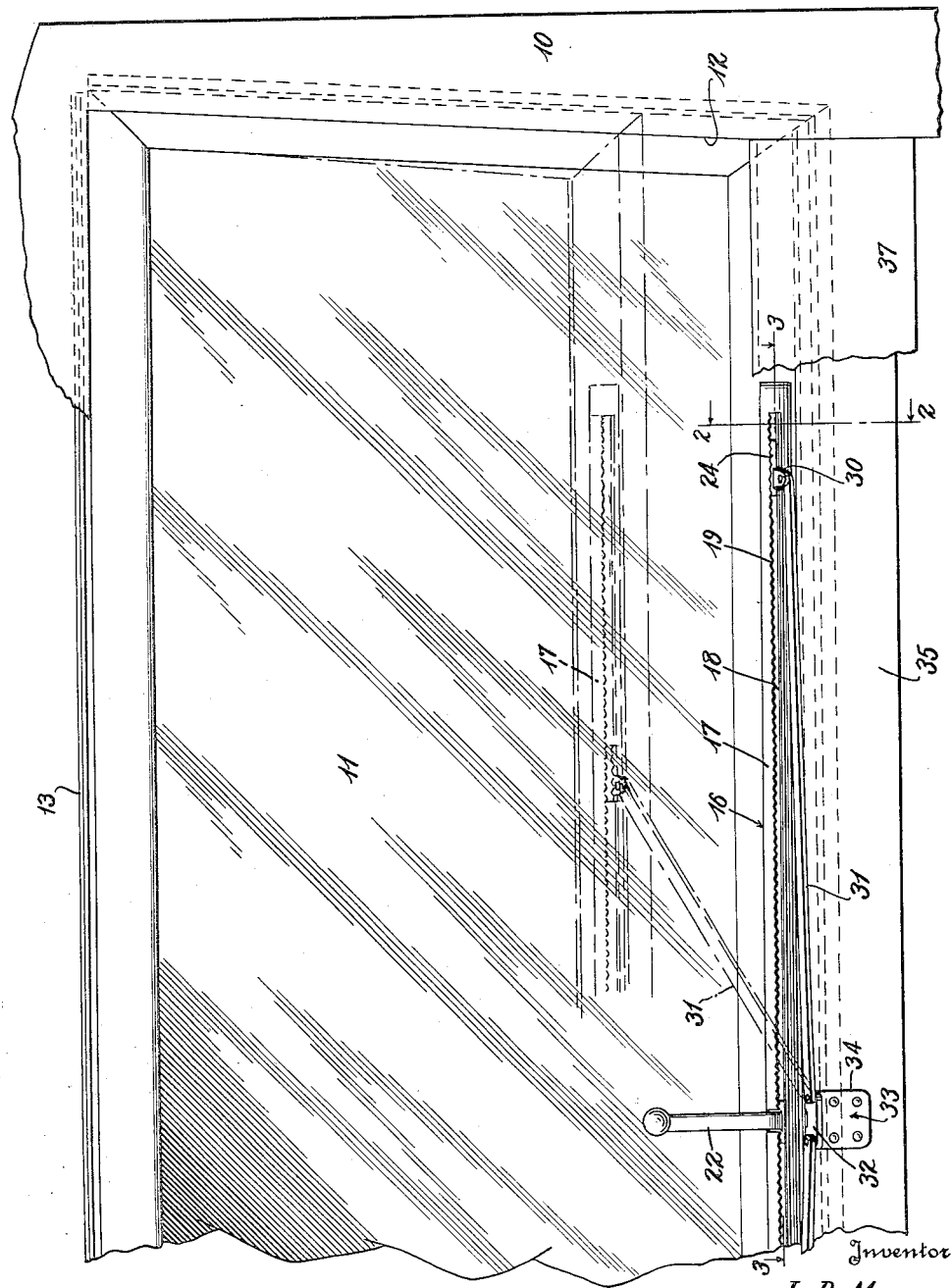

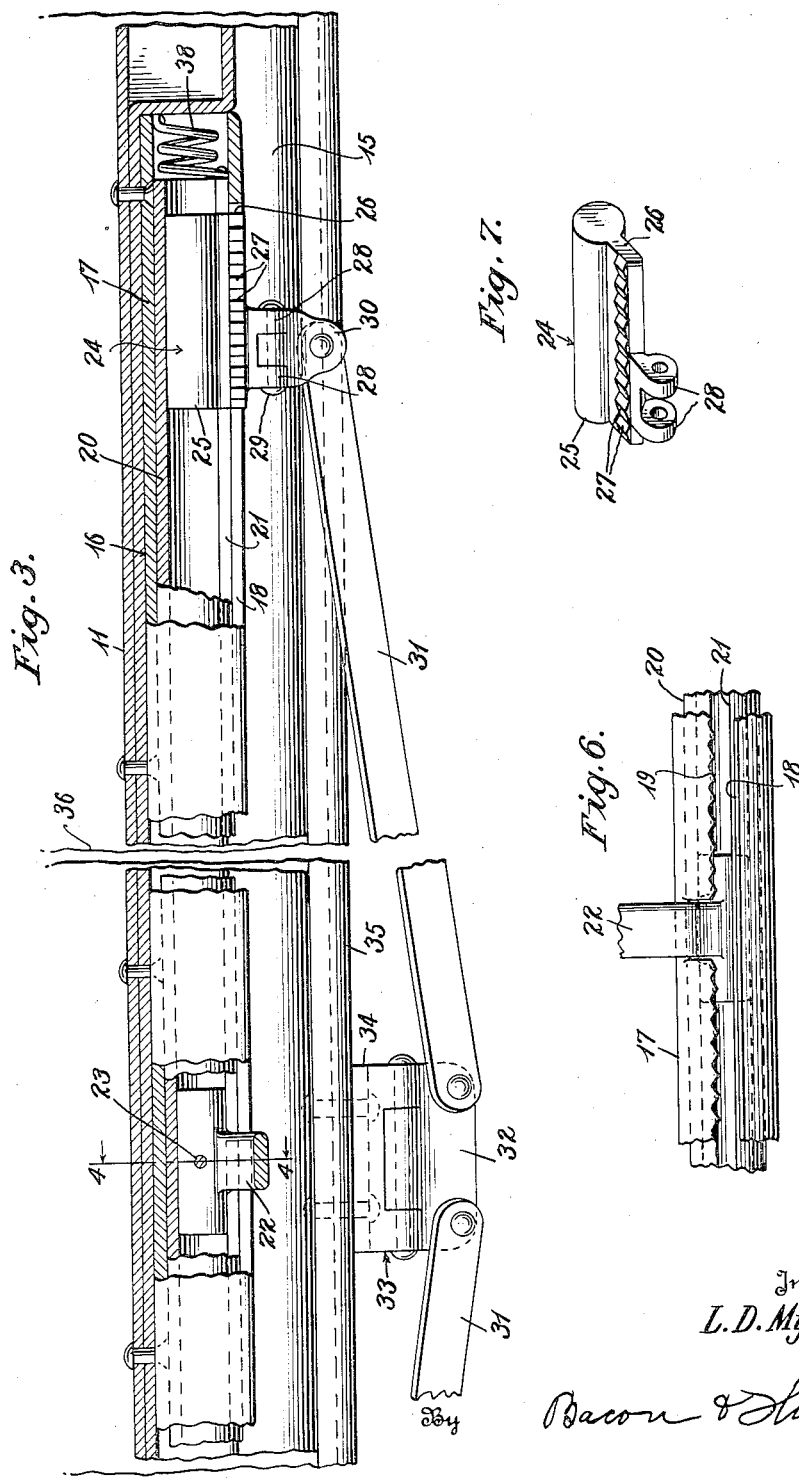

Patented July 17, 1934

1,966,993

UNITED STATES PATENT OFFICE 1,966,993

WINDSHIELD CONTROL

Leonard D. Myers, Washington, D. C., assignor to Martin-Parry Corporation, York, Pa., a corporation of Delaware Application November 20, 1931, Serial No. 576,380

7 Claims. (Cl. 296—84)

This invention relates to new and useful improvements in windshield controls.

A primary object of this invention is to provide controlling mechanism operable to retain a pivoted windshield member in any desired position of adjustment.

A further object of the invention is to provide a control mechanism for windshields wherein a major portion of the same is carried by, and preferably built into, the lower longitudinal frame member of the windshield.

Further objects and advantages of the invention will be apparent during the course of the following description.

In the accompanying drawings forming a part of this specification, and in which like numerals are employed to designate like parts throughout the same, Figure 1 is a fragmentary elevational view of a motor vehicle windshield with the form of control mechanism embodying this invention operatively associated therewith;

Figure 2 is a detailed sectional view taken on the line 2—2 of Fig. 1;

Figure 3 is a fragmentary longitudinal sectional view showing in detail the control mechanism and taken on the line 3—3 of Fig. 1;

Figure 4 is a detailed transverse sectional view taken on the line 4—4 of Fig. 3;

Figure 5 is a detailed vertical sectional view showing a slightly modified form of housing for the control mechanism;

Figure 6 is a fragmentary elevational view of a part of the control mechanism; and Figure 7 is a detailed perspective view of one element of the mechanism.

In the drawings, wherein for the purpose of illustration is shown a preferred embodiment of this invention, the numeral 10 designates in its entirety, the portion of a motor vehicle body with which the windshield 11 is operatively associated. The vehicle body 10 is provided with an opening 12 to be controlled by the windshield 11 which is pivotally connected at its upper edge portion 13 to the margin of the opening 12. The specific form of hinge connection between the windshield and the frame is not illustrated, as it forms no part of this invention.

In Figs. 2 and 4, the lower longitudinal edge or frame portion of the windshield 11 is illustrated as being formed of properly shaped sheet metal including a channel portion 14 to receive a rubber sealing or packing member 15. Just above the channel portion 14, and extending longitudinally of the lower frame member of the windshield, is a second channel portion 16, within which is positioned a housing 17. This housing is provided with a longitudinally extending slot 18 having a row of teeth 19 formed in its upper edge. These teeth are best illustrated in Figs. 1, 2 and 6. Loosely positioned within the housing 17 for rotation therein, is a tubular sleeve 20, having a longitudinally extending slot 21 formed therein which registers with the slot 18 in the housing 17. This actuating sleeve 20 has secured thereto an operating lever or handle 22, the connection between the lever or handle and the sleeve being illustrated in Fig. 4 as including a transversely extending rivet 23. By moving the handle or lever 22 vertically, either upwardly or downwardly, the actuating sleeve 20 is caused to rotate within the housing 17.

Slidably positioned within the actuating sleeve 20 are blocks 24, which are best illustrated in Figs. 3 and 7. It is to be understood that one of these blocks is provided in each half of the actuating sleeve 20, and are separated by the operating lever or handle 22 which, preferably, is located at the intermediate portion of the actuating sleeve. Each one of these slidable blocks 24 includes a substantially solid cylindrical body portion 25, which has suitably united thereto a plate-like extension 26, which extends the full length of the body portion. This extension is provided with a longitudinal series of teeth 27 corresponding in shape and size with the teeth 19 formed on an edge of the housing 17. A pair of parallel, apertured ears 28 project from one edge of the plate-like extension 26. The apertured ears for each slidable block 24 have pivotally connected thereto, as by means of a pin 29, a connector 30 to which is pivotally connected a bracing arm 31. The remaining end of each arm 31 is pivotally connected to one leaf 32 of a hinge structure designated in its entirety by the reference character 33, and best illustrated in Fig. 2. The remaining leaf portion 34 of this hinge structure is rigidly secured to a depending flange portion 35 of the cowl 36 which forms a part of the vehicle with which this invention is associated. Fig. 2 discloses a fragmentary portion of an instrument board 37 which functions to conceal the control mechanism from the occupants of the vehicle.

By inspecting Figure 2, it will be noted that the bracing arm 31 and the plate-like extension 26 are arranged at an obtuse angle with respect to each other when the operating lever or handle 22 is arranged to lock the windshield against movement. This angular arrangement locates the pivot pin 29, employed for connecting the elements 26 and 31, above a plane which intersects the axis of the slidable block 24 and the axis of the pivot pin employed for connecting the hinge leaves 32 and 34. In other words, when the retaining mechanism is set for restraining movement of the windshield, the pivot pin 29 is thrown off center which results in the weight of the windshield being delivered against the plate-like extension 26 for causing its teeth 27 to be retained in engagement with the teeth 19 formed on an edge of the housing 17. The weight of the windshield therefore, tends to retain these teeth in interlocked relation.

A spring element 38 is illustrated in Fig. 3, and functions to retain the operating lever or handle 22 in the position illustrated in Figs. 1, 2 and 4, which is the locking position of this member 22.

Fig. 5 illustrates a modification which shows a housing 17a secured to the lower frame portion of a windshield a, to project outwardly from one face of the windshield, this form differing from the form illustrated in the remaining figures, wherein the housing is built into or positioned within a channel formed within the windshield frame.

Figs. 1, 2 and 3 illustrate the windshield in its closed position. Fig. 1 illustrates in dot and dash lines the windshield in a partially opened position. Starting with the windshield in its closed position, should a person occupying the vehicle equipped with this device, desire to open or raise the windshield, it is only necessary for this person to move the control lever or handle 22 downwardly to rotate or rock the control sleeve 20 within the housing 17. This movement of the sleeve causes the slidable blocks 24 positioned therein to be pivoted with respect to the housing 17, for causing the teeth 27 carried by the blocks 24, to be moved out of engagement with the teeth 19 carried by the housing 17. With these sets of teeth out of engagement, the operator may push the windshield open by applying pressure to the end of the operating lever or handle 22. When the windshield has been properly adjusted, the operator may move the member 22 into its normal vertical position, whereupon the teeth 27 of the blocks 24 will engage the teeth 19 of the housing 17. Endwise movement of the blocks with respect to the housing will then be prevented, and the bracing arms 31 will retain the windshield in its open position. The operating lever or handle 22 is retained in this vertical or locking position by means of one or more springs 38. When it is desired to close the windshield or readjust the same, it is only necessary to shift the member 22 into substantially a horizontal position, and then apply force to this member 22 in the desired direction to move the windshield. The windshield then is locked in the manner described above.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. In combination, a vehicle body, a windshield hingedly connected along its upper edge to said body, a hinge member connected to the vehicle body adjacent the lower free edge of the windshield, a pair of bracing arms connected to a portion of said hinge member, means for slidably connecting the free ends of said bracing arms to the lower free edge portion of the windshield, and means for preventing relative sliding adjustment between the free ends of the bracing arms and the windshield to retain the windshield in any desired position of adjustment, said last mentioned means being restrained from unintentionally releasing the windshield by the weight of the latter bearing thereupon.

2. In combination, a vehicle body, a windshield hingedly connected thereto to swing outwardly therefrom, a pair of arms connected at their inner ends to the vehicle body by a universal joint, means for slidably and pivotally connecting the outer ends of the arms to the free edge portion of the windshield, and means carried by the windshield for preventing relative movement between the free end portions of the arms and the windshield to retain the windshield in any desired position of adjustment, the pivotal connections between the arms and the windshield being adapted to maintain said last mentioned means operative due to the weight of the windshield being applied thereto.

3. In combination, a vehicle body, a windshield hinged along one edge to said body, an element connected to the windshield to slide with respect thereto in a direction parallel to the axis of the hinge, a brace member pivotally connected to the body, a break joint connecting the brace member to said slidable element, means associated with the element and the windshield for holding said element against movement to retain the windshield in any desired position of adjustment, and means for rendering active the windshield holding means, said break joint functioning to deliver the weight of the windshield to the sliding element to maintain the means associated with the element and the windshield in operative relation.

4. In combination, a motor vehicle body, a windshield hinged thereto at its upper edge, a housing associated with the lower frame portion of the windshield, slidable and rotatable members positioned within said housing, means for restraining said members against sliding movement within the housing when they are rotated into engagement with the last mentioned means, and means connected to the members and the vehicle body being constructed and arranged for bracing the windshield in any desired position of adjustment by delivering the weight of the windshield against the members in a direction tending to rotate the members into engagement with the restraining means.

5. In combination, a vehicle body, a windshield hinged along its upper edge to said body, an element connected to the windshield to slide with respect thereto in a direction parallel to the axis of the hinge and to rotate about the axis of its path of movement, means associated with the windshield and the element adapted to be engaged to hold the element against sliding movement when the element is rotated in one direction, and means for supporting the windshield in adjusted positions connected to the vehicle body and to the said element in a manner to cause the weight of the windshield to tend to rotate the element in said one direction.

6. In combination, a vehicle body, a windshield hinged along its upper edge to said body, an element connected to the windshield to slide with respect thereto in a direction parallel to the axis of the hinge and to rotate about the axis of its path of movement, means associated with the windshield and the element adapted to be engaged to hold the element against sliding movement when the element is rotated in one direction, means for supporting the windshield in adjusted positions connected to the vehicle body and to the said element in a manner to cause the weight of the windshield to tend to rotate the element in said one direction, and means for rotating the element in the opposite direction to disengage said cooperating means for permitting sliding movement of the element.

7. In combination, a vehicle body, a windshield hinged along its upper edge to said body, an element connected to the windshield to slide with respect thereto in a direction parallel to the axis of the hinge and to rotate about the axis of its path of movement, means associated with the windshield and the element adapted to be engaged to hold the element against sliding movement when the element is rotated in one direction, means for supporting the windshield in adjusted positions connected to the vehicle body and to the said element in a manner to cause the weight of the windshield to tend to rotate the element in said one direction, control means extending throughout the entire path of sliding movement of the element for rotating the element in the opposite direction to disengage said cooperating means for permitting sliding movement of the element, and a handle for operating said control means.

LEONARD D. MYERS.